(12) United States Patent
Lemmers, Jr. et al.

(10) Patent No.: US 9,006,942 B2
(45) Date of Patent: Apr. 14, 2015

(54) GENERATOR MAIN STATOR BACK-IRON COOLING SLEEVE

(75) Inventors: Glenn C. Lemmers, Jr., Loves Park, IL (US); Eric A. Brust, Machesney Park, IL (US); Andrew P. Grosskopf, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1235 days.

(21) Appl. No.: 12/436,913

(22) Filed: May 7, 2009

(65) Prior Publication Data

US 2010/0283334 A1     Nov. 11, 2010

(51) Int. Cl.
    *H02K 9/193*      (2006.01)
    *H02K 5/20*       (2006.01)
    *H02K 1/18*       (2006.01)

(52) U.S. Cl.
    CPC .................. *H02K 5/20* (2013.01); *H02K 1/185* (2013.01); *H02K 2205/12* (2013.01)

(58) Field of Classification Search
    USPC ........................................... 310/428–430, 89
    See application file for complete search history.

(56) References Cited

U.S. PATENT DOCUMENTS

| | | | |
|---|---|---|---|
| 2,611,798 A * | 9/1952 | Hayes | 310/54 |
| 3,009,072 A * | 11/1961 | Mossay | 310/57 |
| 4,134,036 A * | 1/1979 | Curtiss | 310/216.113 |
| 4,139,789 A | 2/1979 | Hunt | |
| 4,156,172 A | 5/1979 | Hucker et al. | |
| 4,180,895 A | 1/1980 | Spikes et al. | |
| 4,311,932 A | 1/1982 | Olson | |
| 4,329,603 A | 5/1982 | Ballard | |
| 4,513,218 A | 4/1985 | Hansen | |
| 4,621,210 A | 11/1986 | Krinickas, Jr. | |
| 4,647,805 A | 3/1987 | Flygare et al. | |
| 4,797,590 A | 1/1989 | Raad et al. | |
| 5,006,741 A | 4/1991 | Schott | |
| 5,166,564 A | 11/1992 | Shahamat et al. | |
| 5,299,350 A * | 4/1994 | Lyle et al. | 29/596 |
| 5,331,238 A | 7/1994 | Johnsen | |
| 5,365,133 A | 11/1994 | Raad | |
| 5,587,647 A | 12/1996 | Bansal et al. | |
| 5,648,694 A * | 7/1997 | Kobayashi et al. | 310/87 |
| 5,825,107 A | 10/1998 | Johnson et al. | |
| 5,939,808 A * | 8/1999 | Adames | 310/89 |
| 6,091,168 A | 7/2000 | Halsey et al. | |
| 6,517,328 B2 * | 2/2003 | Makino et al. | 417/410.1 |
| 6,583,995 B2 | 6/2003 | Kalman et al. | |
| 6,628,022 B2 | 9/2003 | Clayton et al. | |
| 6,750,572 B2 | 6/2004 | Tornquist et al. | |
| 6,819,016 B2 | 11/2004 | Houle et al. | |

(Continued)

FOREIGN PATENT DOCUMENTS

| | | | |
|---|---|---|---|
| EP | 631365 A2 * | 12/1994 | H02K 5/20 |
| JP | 63310367 | 12/1988 | |
| WO | WO 2008004173 A1 * | 1/2008 | F16L 17/04 |

OTHER PUBLICATIONS

Sudar, WO2008004173 A1 Machine Translation, Jan. 2008.*

*Primary Examiner* — Quyen Leung
*Assistant Examiner* — Eric Johnson
(74) *Attorney, Agent, or Firm* — Carlson, Gaskey & Olds, P.C.

(57) ABSTRACT

A main stator sleeve for a generator includes a sheet of material that includes an arcuate notch one two opposed edges such that a butt joint therebetween defines a pin aperture.

12 Claims, 8 Drawing Sheets

(56) References Cited

U.S. PATENT DOCUMENTS

| | | |
|---|---|---|
| 6,885,120 B2 | 4/2005 | Kaminski et al. |
| 6,897,581 B2 | 5/2005 | Doherty et al. |
| 6,903,470 B2 | 6/2005 | Doherty et al. |
| 6,965,185 B1 | 11/2005 | Kaminski et al. |
| 6,984,924 B1 * | 1/2006 | Voigt et al. .................... 310/348 |
| 7,208,854 B1 | 4/2007 | Saban et al. |
| 2003/0094872 A1 | 5/2003 | Tornquist et al. |
| 2004/0124720 A1 * | 7/2004 | Condamin et al. .............. 310/51 |
| 2005/0146231 A1 | 7/2005 | Or et al. |
| 2005/0156471 A1 | 7/2005 | Kobayashi et al. |
| 2006/0113870 A1 * | 6/2006 | Kienzler et al. .............. 310/328 |

* cited by examiner

GENERATOR MAIN STATOR BACK-IRON COOLING SLEEVE

BACKGROUND

The present disclosure relates to a generator, and more particularly to an internal oil management system for a starter-generator.

Aircraft powered by gas turbine engines often include a mechanically driven accessory gearbox which connects to accessory systems such as an electrical starter-generator or electric generator.

High power density aircraft generators utilize an internal oil management system. The internal oil management system provides supplemental cooling to the generator main stator through a back iron oil flow which is defined by oil grooves formed within the stator housing. As the main stator is typically constructed as a stack of adhesively bonded laminations, a main stator sleeve is typically mounted between the lamination stack and the oil cooling grooves to ensure oil does not leak through the lamination stack into the generator air gap thus increasing generator losses due to viscous shear of oil within the generator air gap.

The main stator sleeve is typically constructed from bar or tube stock which is machined on an inner diameter to closely fit onto the main stator core. The outer diameter of the main stator sleeve is then machined after installation onto the main stator core to assure a close fit with the oil grooves. Although effective, such machining is relatively significant as machining is required prior and subsequent to main stator core assembly.

SUMMARY

A main stator sleeve for a generator according to an exemplary aspect of the present disclosure includes a sheet of material that includes an arcuate notch on two opposed edges such that a butt joint therebetween defines a pin aperture.

A housing assembly for a generator according to an exemplary aspect of the present disclosure includes a cylindrical stator housing which defines at least one oil groove. A main stator sleeve mounted adjacent to the cylindrical stator housing to at least partially enclose the at least one oil groove and defines a butt joint.

A generator according to an exemplary aspect of the present disclosure includes a cylindrical stator housing which defines at least one oil groove. A main stator assembly is installed within the cylindrical stator housing such that a main stator sleeve is mounted between the cylindrical stator housing and the main stator assembly. The main stator sleeve at least encloses the at least one oil groove.

A method of forming a main stator assembly according to an exemplary aspect of the present disclosure includes locating a main stator sleeve formed from a rectilinear piece of material within a cylindrical stator housing which defines at least one oil groove and at least partially enclose the at least one oil groove.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
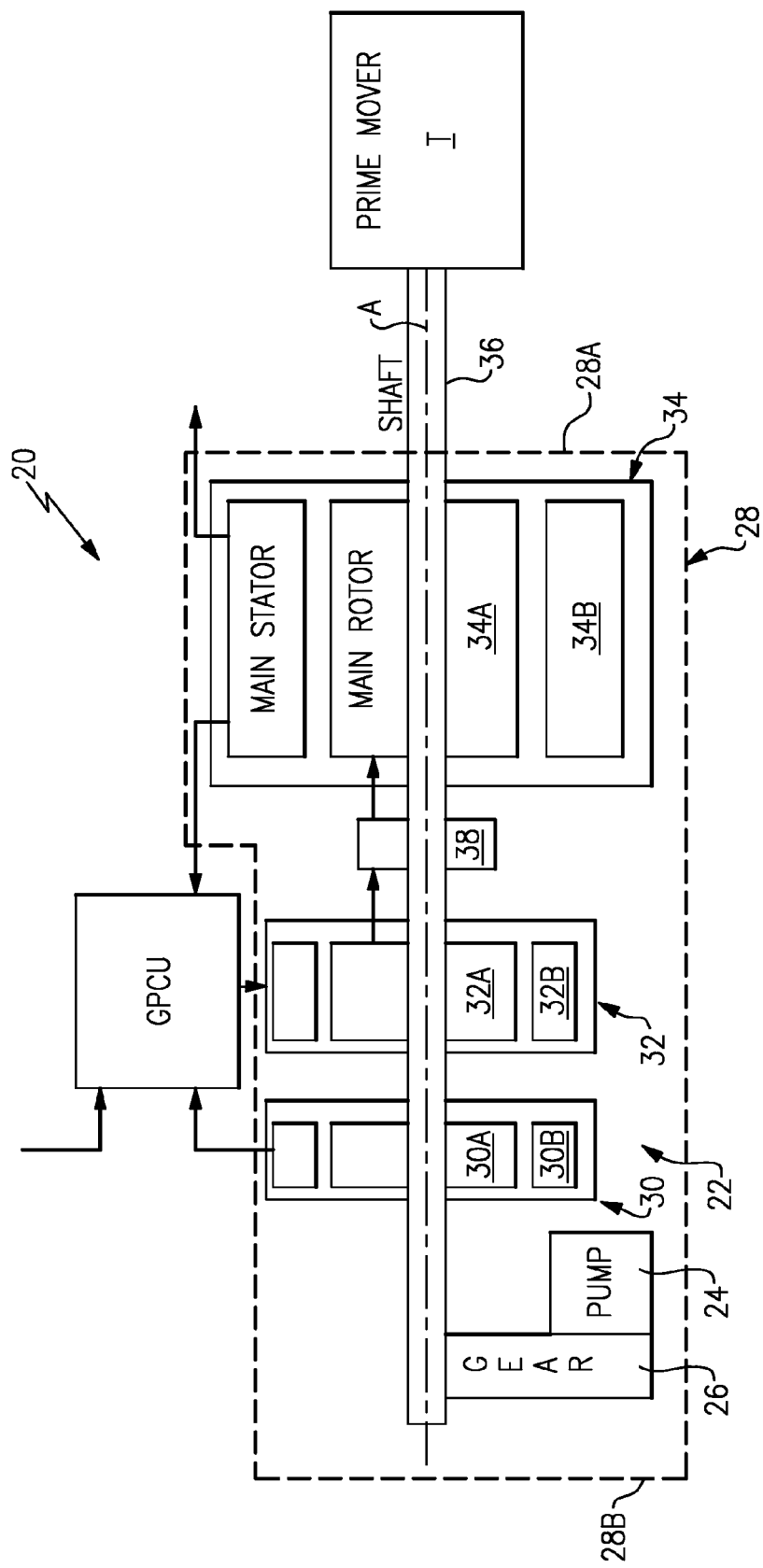
FIG. 1 is a general schematic sectional view of a starter-generator for a gas turbine engine.

FIG. 1 schematically illustrates selected portions of an example generator 20, which may be used for starting a prime mover T such as a gas turbine engine, or for generating electrical current when being driven by the prime mover T. The generator 20 may generally include a dynamoelectric portion 22, a positive displacement pump 24 and a gearbox 26 therebetween, all contained within a common main housing assembly 28. Although a variable frequency generator (VFG) is illustrated in the disclosed embodiment, it should be understood that other generator systems such as an Integrated Drive Generator (IDG) will also benefit herefrom. These types of generators may be particularly well suited for aircraft applications.

The dynamoelectric portion 22 in the disclosed, non-limiting embodiment is a 3-phase machine that includes three machines 30, 32 and 34 mounted on a common rotor shaft 36 along an axis of rotation A. Stator assemblies 30B, 32B, 34B of the three machines are installed in the main housing 28 and the three rotor assemblies 30A, 32A, 34A are installed on the rotor shaft 36. The main housing assembly 28 may be closed with a drive end (DE) cover assembly 28A through which the rotor shaft 36 extends and a non-drive end (NDE) cover assembly 28B.

The first machine 30 includes a permanent magnet generator (PMG) with a PMG rotor assembly 30A and PMG stator assembly 30B. The PMG stator assembly 30B supplies power for generator excitation, as well as power for other components of the electrical system. The second machine 32 includes a Main Exciter (ME) with a ME rotor assembly 32A and a stator assembly 32B. The ME receives field excitation from the PMG through a GGPCU (Generator and Ground Power Control Unit). The output of the ME rotor assembly 32A is supplied to a shaft mounted diode system 38. The diode pack 38 may be divided into six diode groups to provide a 3-phase full wave bridge rectification. The DC output of the diode pack 38 supplies the third machine 34.

Figure 2:
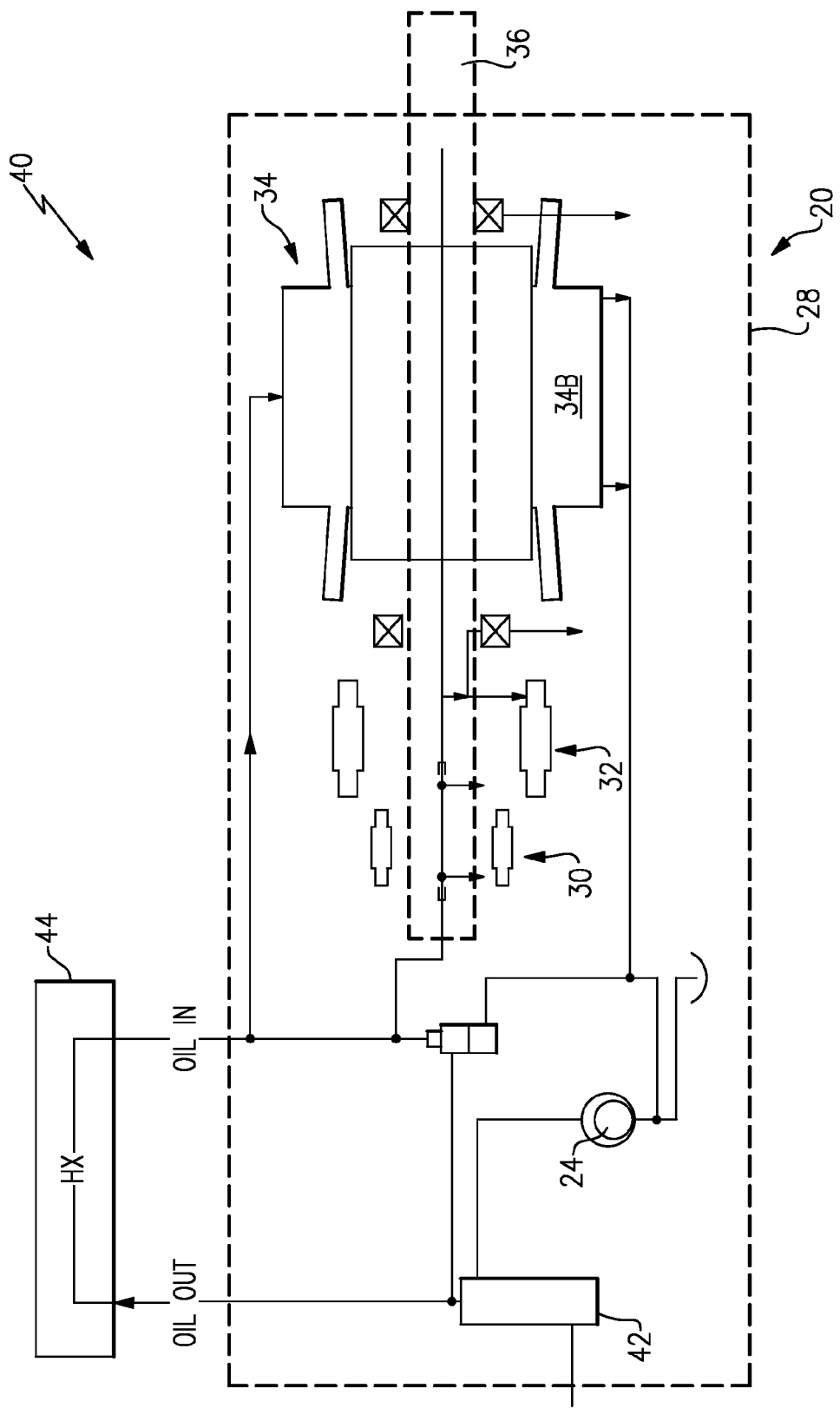
FIG. 2 is a schematic view of a an internal oil management system for the starter-generator.

Referring to FIG. 2, the generator 20 includes an internal oil management system 40 driven by the positive displacement pump 24. The oil collects in the generator sump/reservoir and is removed by the positive displacement pump 24 within the housing assembly 28. The pump 24 supplies oil through an internal filter 42 to an external heat exchanger 44. The heat exchanger 44 then supplies the oil to the rotor shaft 36, which supplies oil to the internal components of the generator 20. Oil through the center of the rotor shaft 36 cools the rotor windings and supplies oil as a spray to cool the diodes, lubricate the bearings and stator overhangs. Oil is also communicated into oil grooves 50 (FIG. 3) formed in the housing assembly 28 to flow oil around the main stator assembly 34B.

Figure 3:
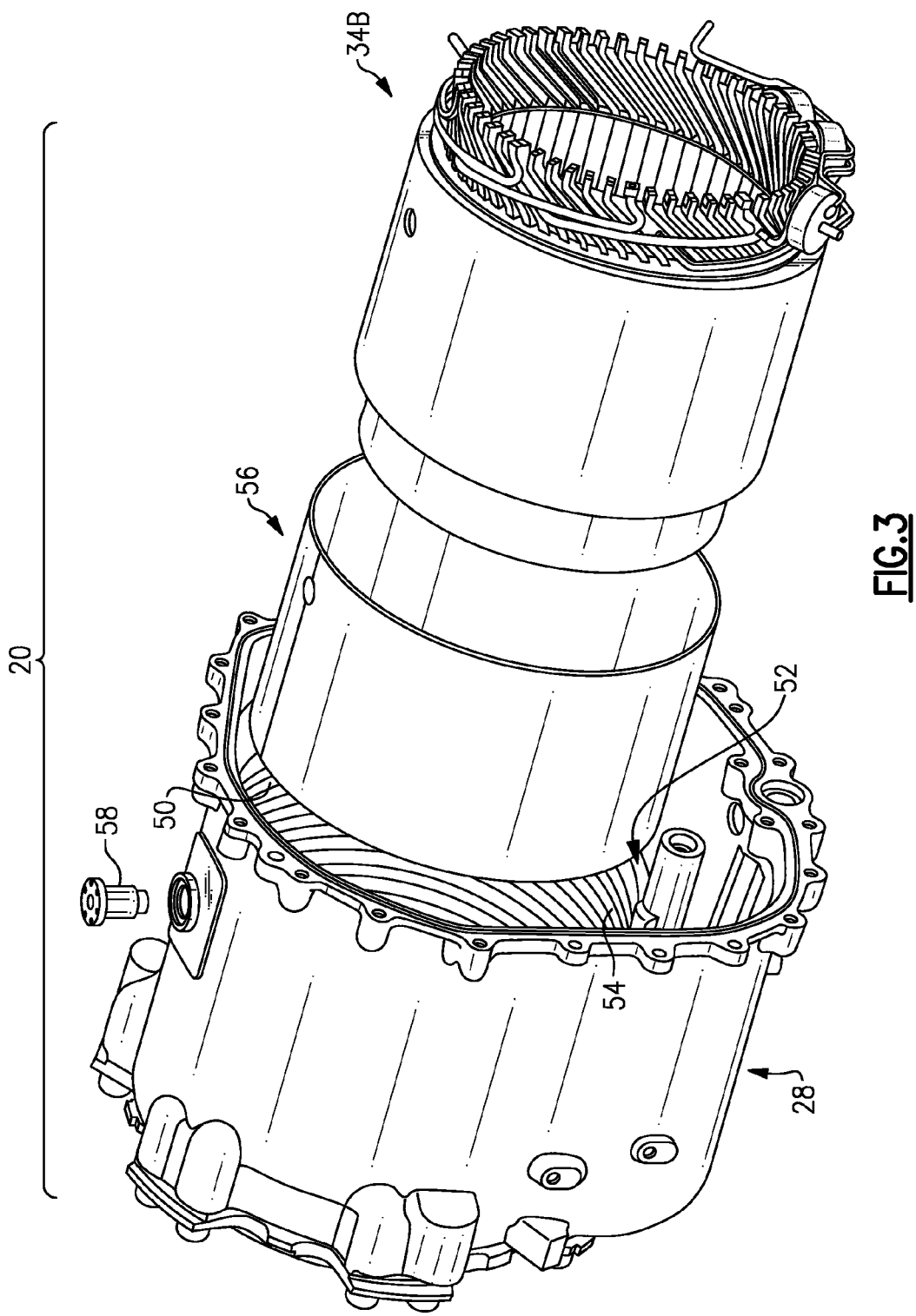
FIG. 3 is an exploded view of the starter-generator.

Referring to FIG. 3, the housing assembly 28 includes a cylindrical stator housing 52. The oil grooves 50 are defined within an inner circumference 54 of the cylindrical stator housing 52. A main stator sleeve 56 is located between the inner circumference 54 and the main stator assembly 34B. The main stator sleeve 56 and main stator assembly 34B are both axially and radially retained within the housing 28 with a pin 58 that radially extends through the housing 28, main stator sleeve 56, and into the main stator assembly 34B.

Figure 4:
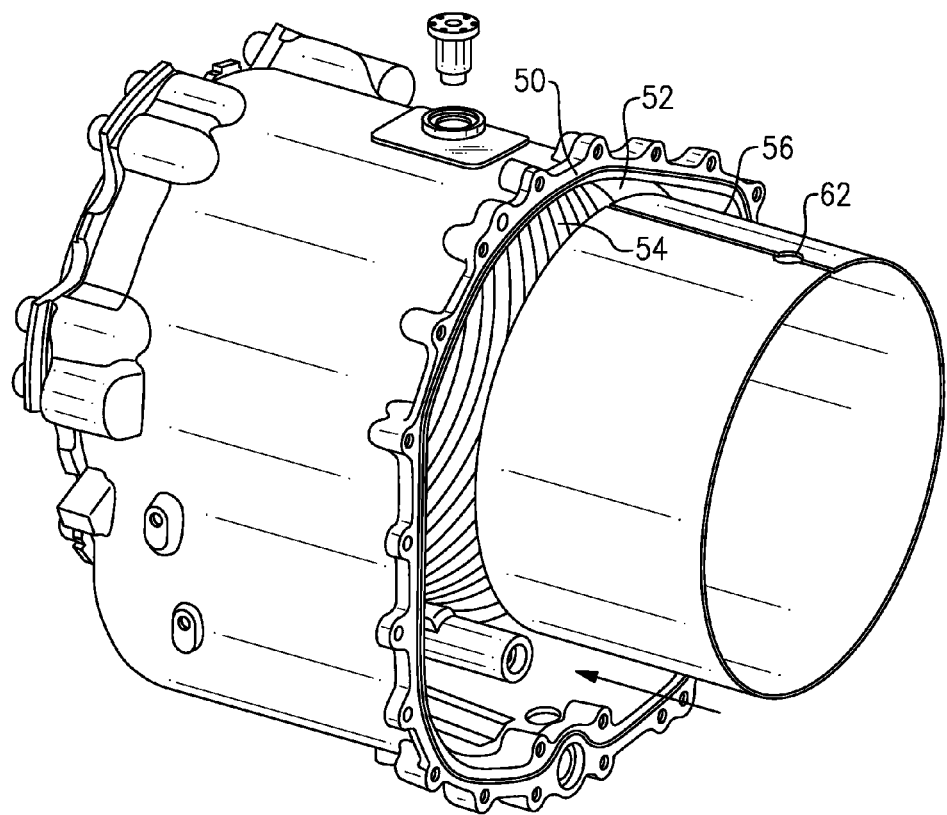
FIG. 4 is a perspective view of a main stator sleeve in an uninstalled condition.

Referring to FIG. 4, the main stator sleeve 56 is constructed of spring steel that is of a rectilinear shape consistent with the generator main stator length and circumference. The main stator sleeve 56 is thereby inserted into the cylindrical stator housing 52 and the inherent spring of the material forces the main stator sleeve 56 against the oil grooves 50 to thereby seal the oil grooves 50 without the heretofore necessity of tight tolerance ID/OD machining. The main stator sleeve 56 in the disclosed non-limiting embodiment is 0.005 inches (0.127 mm) thick.

Figure 5:
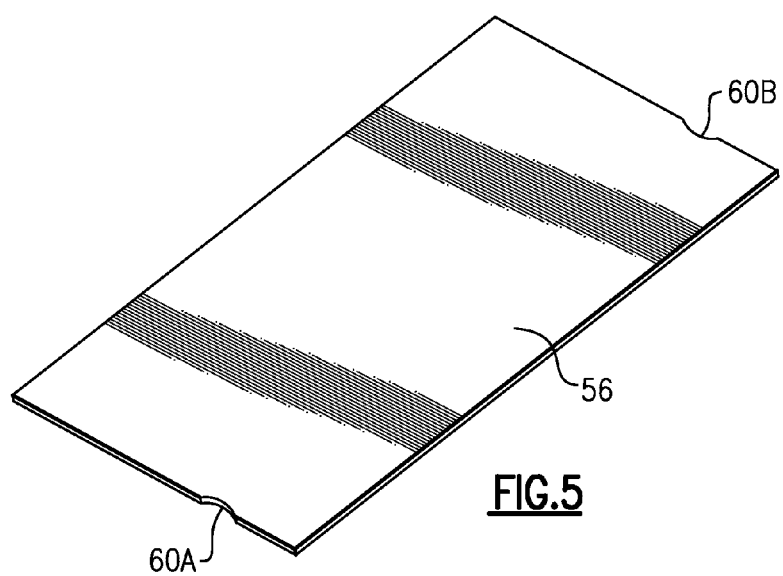
FIG. 5 is a perspective view of a main stator sleeve in an installed condition.

The main stator sleeve 56 includes an arcuate notch 60A, 60B on each opposed edge. The arcuate notch 60A, 60B are formed on the short ends of the rectilinear sheet in the disclosed embodiment, but the arcuate notch 60A, 60B may be formed on the long ends dependant on the cylindrical stator housing 52 configuration. The arcuate notch 60A, 60B forms a pin aperture 62 which receives the pin 58 (FIG. 5). The main stator sleeve 56 is of a relatively straightforward construction which need not be rolled, welded, or subsequently ID/OD machined as heretofore required.

Figure 6:
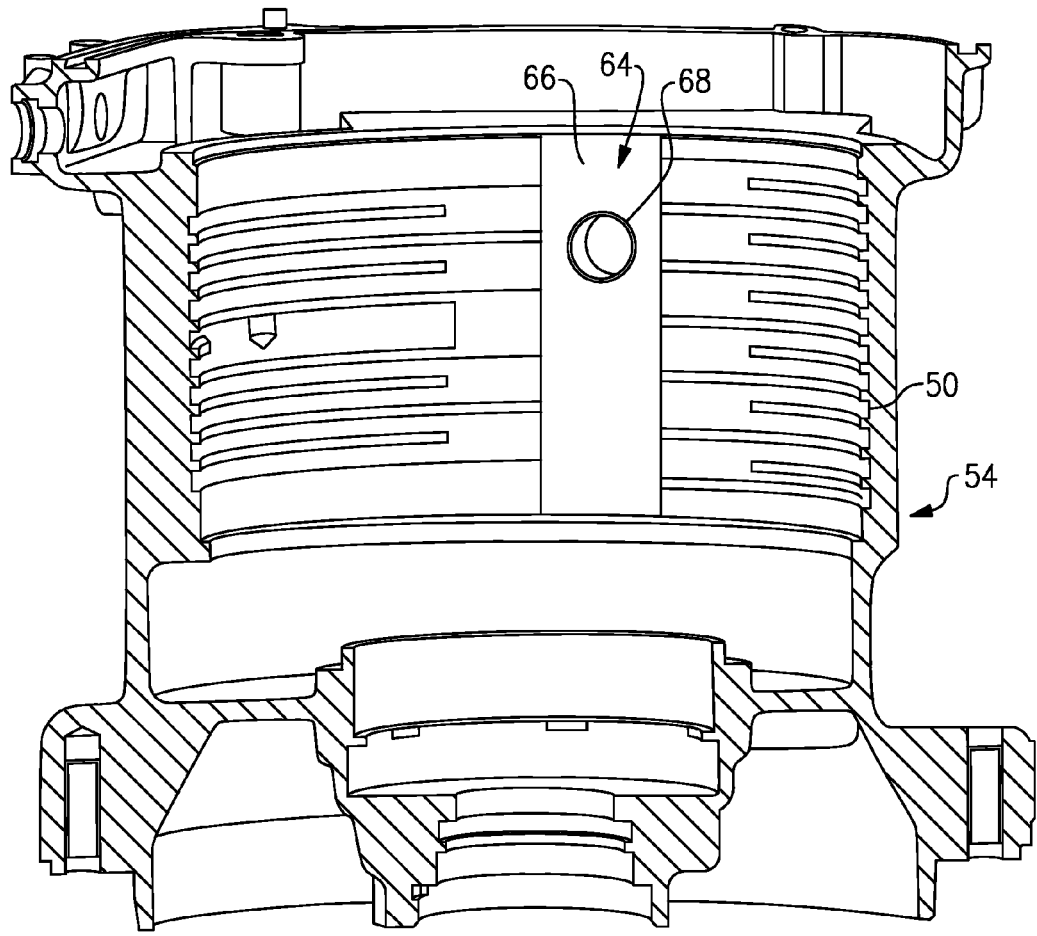
FIG. 6 is a sectional view of a cylindrical stator housing within the starter-generator.
Figure 7:
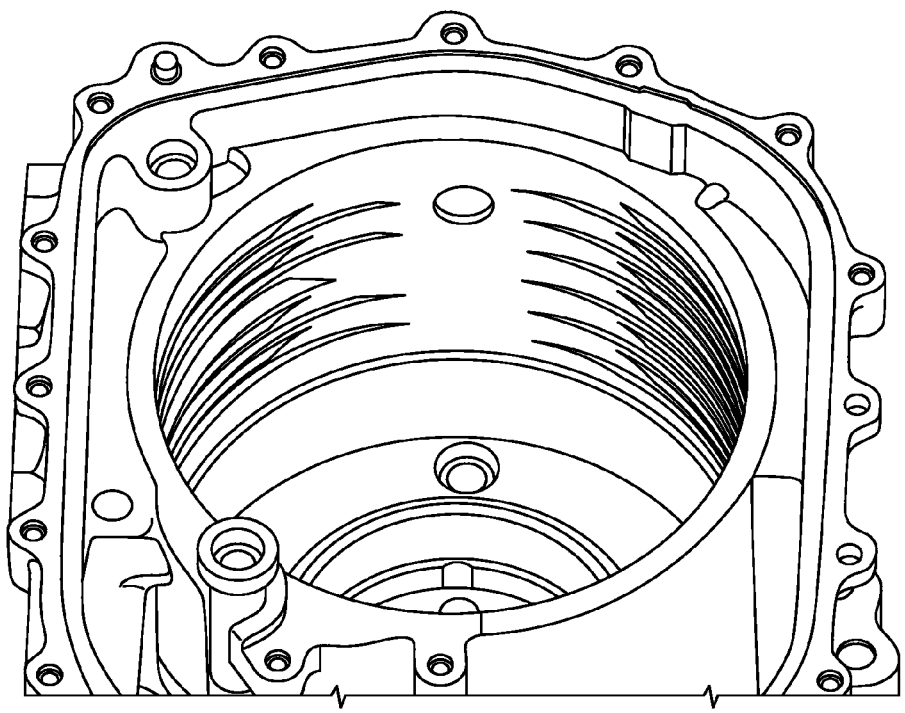
FIG. 7 is an upper perspective view of the cylindrical stator housing within the starter-generator.
Figure 8:
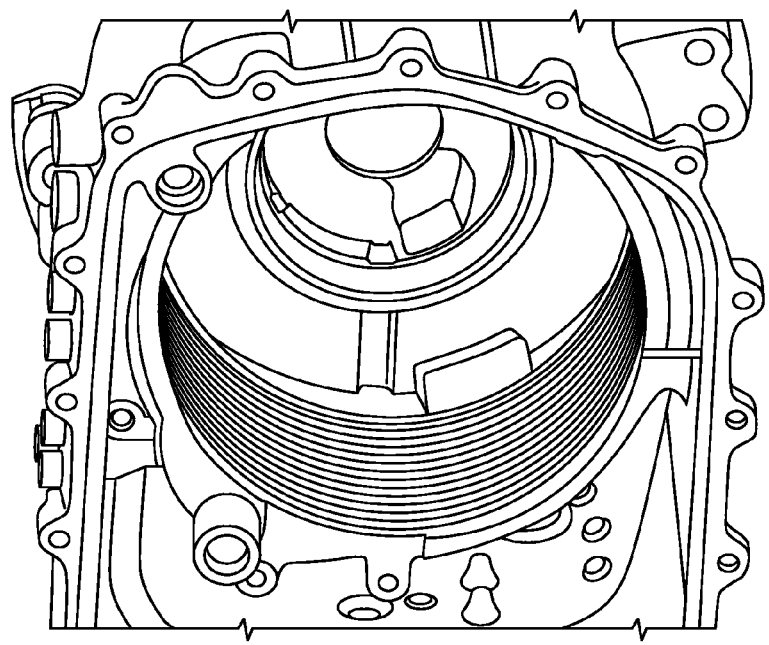
FIG. 8 is a lower perspective view of the cylindrical stator housing within the starter-generator.

Referring to FIG. 6, the oil grooves 50 are interrupted within a neutral zone 64 in the cylindrical stator housing 52 of the housing assembly 28 to define an uninterrupted housing surface 66. A housing pin aperture 68 is located within the neutral zone 64. The oil grooves 50 may be defined around the entire inner circumference 54 except neutral zone 64 (FIGS. 7, 8). It should be understood that the oil grooves 50 may form various oil circuits within the housing 28.

Figure 9:
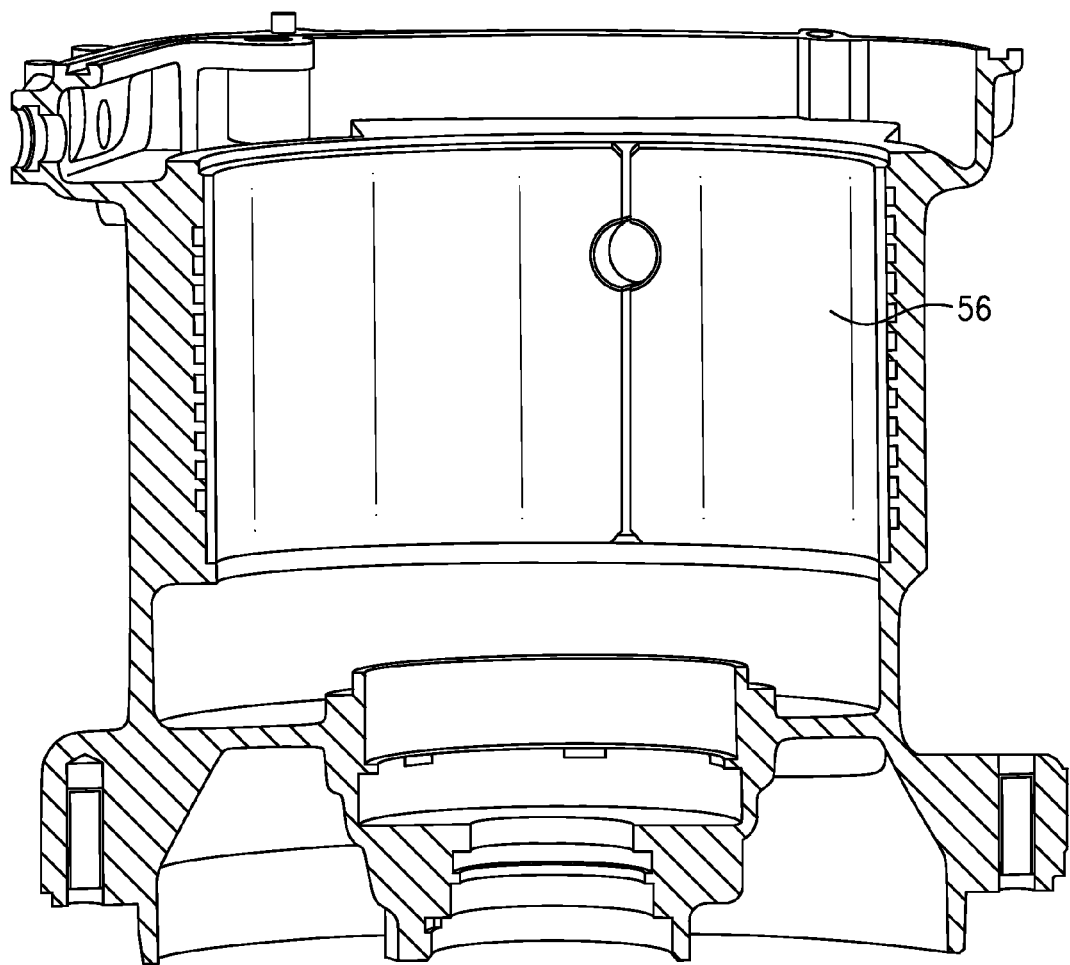
FIG. 9 is a sectional view of the cylindrical stator housing with the main stator sleeve installed.
Figure 10:
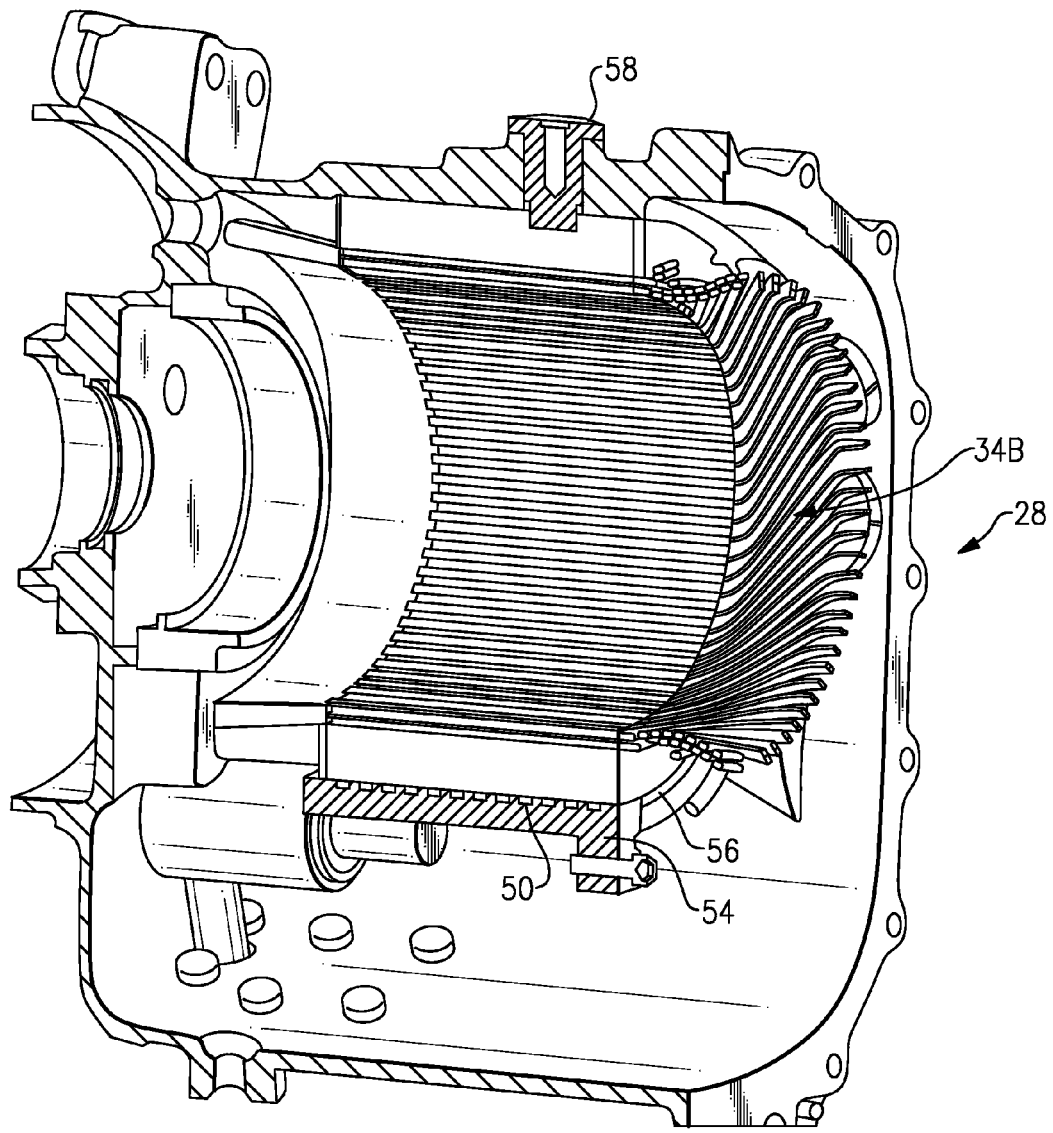
FIG. 10 is a sectional view of the starter-generator in an assembled condition.

The main stator sleeve 56 is mounted within the cylindrical stator housing 52 such that the sleeve butt joint (FIG. 9) is fully supported by the uninterrupted housing surface 66. Upon installation of the main stator assembly 34B, the main stator sleeve 56 is compressed between the main stator assembly 34B and the housing structure. The main stator sleeve 56 and main stator assembly 34B are thereby axially and radially retained by the pin 58 (FIG. 10).

The main stator sleeve 56 readily facilities a reduction in generator cost via reduced sleeve piece part cost and reduced assembly/post assembly sleeve machining costs.

It should be appreciated that the sleeve of the present application is not limited to use in conjunction with a specific type of rotating machine. Thus, although the present application is, for convenience of explanation, depicted and described as being implemented in a starter-generator, it should be appreciated that it can be implemented in numerous other machines including, but not limited to, an auxiliary power unit, a turbo charger, a super charger, an air cycle machine, an alternator, an electric motor, an electric generator, an integrated constant speed drive generator and gearboxes of various types.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A main stator sleeve for a generator comprising:
   a sheet of material that defines an arcuate notch on each of two opposed edges such that a butt joint between the two edges defines a pin aperture, wherein each arcuate notch defines an arc extending between a first point and a second point that are disposed on the respective two opposing edges.

2. The assembly as recited in claim 1, wherein said sheet of material is approximately 0.005 inches thick.

3. The assembly as recited in claim 1, wherein said sheet of material is generally rectilinear and manufactured of spring steel.

4. A housing assembly for a generator comprising:
   a cylindrical stator housing which defines at least one oil groove;
   a main stator sleeve mounted adjacent to said cylindrical stator housing to at least partially enclose said at least one oil groove such that said groove is at least partially formed by said cylindrical stator housing, said main stator sleeve defines a butt joint, wherein said main stator sleeve is manufactured of spring steel.

5. A housing assembly for a generator comprising:
   a cylindrical stator housing which defines at least one oil groove;
   a main stator sleeve mounted adjacent to said cylindrical stator housing to at least partially enclose said at least one oil groove such that said groove is at least partially formed by said cylindrical stator housing, said main stator sleeve defines a butt joint, wherein said main stator sleeve is approximately 0.005 inches thick.

6. A generator comprising:
   a cylindrical stator housing which defines an at least one oil groove;
   a main stator assembly installed within said cylindrical stator housing; and
   a main stator sleeve mounted between said cylindrical stator housing and said main stator assembly to at least partially enclose said at least one oil groove such that said groove is at least partially formed by said cylindrical stator housing, said main stator sleeve defines a butt joint.

7. The generator as recited in claim 6, wherein said cylindrical stator housing defines a neutral zone extending an axial length within said cylindrical stator housing wherein said at least one oil groove is interrupted such that said neutral zone is lacking grooves.

8. The generator as recited in claim 7, further comprising a pin which extends through a housing pin aperture within said neutral zone and a pin aperture defined by an arcuate notch on two opposed edges of said main stator sleeve such that said butt joint therebetween is supported by an uninterrupted housing surface within said neutral zone.

9. The generator as recited in claim 6, wherein said main stator sleeve is manufactured of spring steel approximately 0.005 inches thick.

10. A housing assembly for a generator comprising:
a cylindrical stator housing which defines at least one oil groove;
a main stator sleeve mounted adjacent to said cylindrical stator housing to at least partially enclose said at least one oil groove such that said groove is at least partially formed by said cylindrical stator housing, said main stator sleeve defines a butt joint, wherein said main stator sleeve seals said at least one oil groove.

11. A housing assembly for a generator comprising:
a cylindrical stator housing which defines at least one oil groove;
a main stator sleeve mounted adjacent to said cylindrical stator housing to at least partially enclose said at least one oil groove such that said groove is at least partially formed by said cylindrical stator housing, said main stator sleeve defines a butt joint, wherein a main stator assembly and said main stator sleeve are affixed within said cylindrical stator housing by a pin.

12. A housing assembly for a generator comprising:
a cylindrical stator housing which defines at least one oil groove;
a main stator sleeve mounted adjacent to said cylindrical stator housing to at least partially enclose said at least one oil groove such that said groove is at least partially formed by said cylindrical stator housing, said main stator sleeve defines a butt joint, wherein said main stator sleeve is free of any welded portion.

* * * * *